Aug. 16, 1966   A. KEEL   3,266,483
CAMP STOVE TOASTER
Filed Aug. 11, 1964
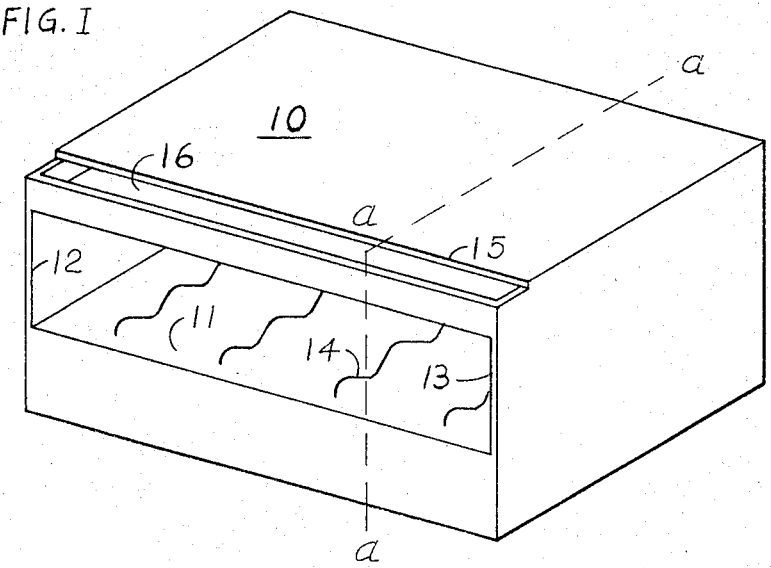
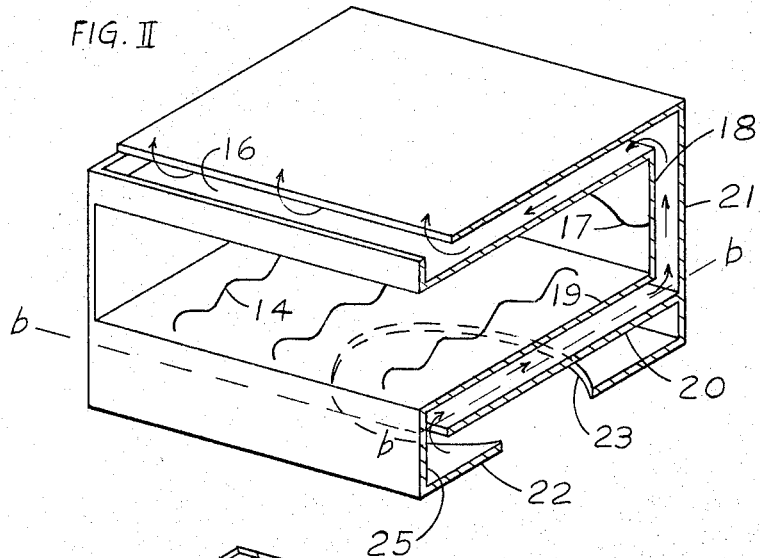
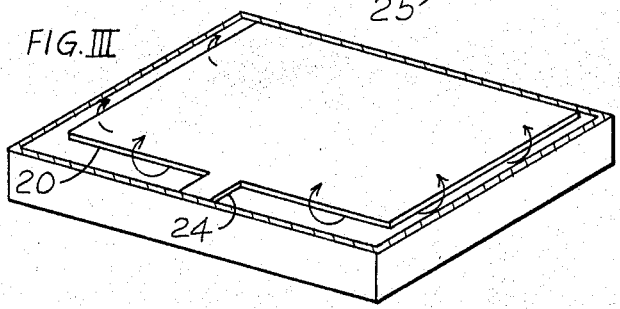
INVENTOR
Adolf Keel

# United States Patent Office 3,266,483
Patented August 16, 1966

3,266,483
CAMP STOVE TOASTER
Adolf Keel, 164 California Ave., Highland Park, Mich.
Filed Aug. 11, 1964, Ser. No. 388,774
4 Claims. (Cl. 126—275)

The invention relates to toasters, and more particularly to toasters intended for use over an open flame such as found on a gas stove or a gasoline camp stove.

The object of the invention is to provide a camp stove toaster which will produce evenly browned slices of toast with a minimum of effort on the part of the operator, and without having the toast come in contact with the products of combustion of the heating flame.

The present invention presents an efficient means of toasting bread over an open flame, since all of the hot gases produced by the flame are utilized to give off a maximum of heat to the toasting chamber in travelling upward in a tortuous path around the chamber. Whereas the actual toasting is performed by the bottom of the toasting chamber, the ceiling of the toasting chamber emits sufficient heat for the melting of cheese in the preparation of toasted cheese sandwiches. Before the hot gases leave the toaster after having circulated around the toasting chamber they also give off part of their heat to the top plate of the toaster which can be utilized as a hot plate. Thus it becomes possible to toast bread and simultaneously keep the water hot for the second cup of coffee with the same small flame.

A further important feature of the invention lies in the fact that the combustion gases do not come in contact with the bread as is the case in camp stove toasters which conduct the combustion gases directly against the bread thru perforated sheet metal parts. The danger of poisoning by volatile lead or other fuel additives is therefore not present even when regular motor fuel is used in the camp stove.

The features of the present invention are explained in greater detail in the following description and in the accompanying drawing, and are again referred to in the appended claims. In the drawing FIG. I is a perspective view of the toaster.

FIG. II is a perspective view of a section along vertical plane a–a–a of FIG. I.

FIG. III is a perspective view of a section along horizontal plane b–b–b in FIG. II.

FIG. I of the drawing illustrates the general appearance of the present invention. The box type sheet metal body 10 contains a horizontal toasting chamber 11 which is a closed compartment except for the frontal opening for inserting and removing the bread. The inside vertical wall of the toasting chamber is held some distance away from the rear vertical wall 21 of body 10. The vertical side walls 12 and 13 of toasting chamber 11 are formed by the vertical side walls of body 10. The slice of bread to be toasted is placed upon a plurality of vertically undulating wire racks 14 attached to the bottom 19 of toasting chamber 11 in order to prevent direct contact between bread and the bottom of the toasting chamber. Top cover 15 of body 10 does not completely cover the top, leaving opening 16 above the frontal entrance to the toasting chamber for the escape of hot gases from below.

The sectional view in FIG. II illustrates the construction and relative position of the toasting chamber in greater detail. The wire guard 17 on the vertical inside wall 18 of the toasting chamber prevents direct contact between bread and wall 18. Below bottom 19 of toasting chamber 11 can be seen the deflector plate 20 which extends forward from the back wall 21 of the body. It has the function of providing an even temperature on the bottom 19 of the toasting chamber. This is accomplished by dimensioning deflector plate 20 so as to direct the greater portion of the hot gases forward under the entrance to the toasting chamber, and a smaller portion of the hot gases straight up past the sides of deflector plate 20 in order to achieve adequate heating of the side portions of toasting chamber 11.

Bottom plate 22 of body 10 serves both as support for the toaster on the grid of the stove and as a shield to prevent excessive loss of heat downward. It is provided with a central opening 23 for the admission of the hot gases produced by the flame of the stove.

The upward movement of the hot gases from entrance 23 to exit 16 is illustrated by arrows in both FIG. II and FIG. III. The latter also shows the general shape and position of deflector plate 20 in the body, and the flow of gases around it. The narrow tongue 24 on plate 20 serves to attach the latter to the front wall 25 of body 10.

What I claim is as follows:

1. A device for the toasting of sliced bread over the flame of a gasoline stove or the likes having a sheet metal box type body in the general form of a rectangular prism, a horizontal toasting chamber extending some distance into said body, said toasting chamber being closed on all sides except the open front side used for inserting and removing the bread slices and being enough smaller than the said body in all dimensions except the width to permit circulation of combustion gases around the outside of said toasting chamber, means disposed inside of said toasting chamber for supporting the bread so as to keep it a short distance above the floor surface of said toasting chamber, said means coming in contact with both the bread and the floor of said toasting chamber, the bottom wall of said body having an opening for the admission of hot gases into the body, and an opening provided in the said body above the said toasting chamber and near the entrance to the toasting chamber for venting the gases which have entered the body thru the opening in the bottom wall.

2. A toaster for the toasting of bread slices over the flame of a gas burner or the likes combining a body made of sheet metal in the general form of a rectangular prism with a horizontal toasting chamber in said body, said toasting chamber having one frontal opening for the insertion and the removal of bread slices but no communication with the inside of said body, a horizontal deflector plate inside said body between said toasting chamber and the bottom member of said body extending forward from the rear wall of said body, an opening in the member forming the bottom of said body for the admission of hot combustion gases, and an exit opening in said body above the said toasting chamber and near its frontal opening for the escape of the gases entering at the bottom, said arrangement of openings in the bottom member of the body and in the top of the said body in combination with the said deflector plate and the location of the toasting chamber inside the said body providing a continuous upward path for the gases entering at the bottom around the outside of the said toasting chamber, first toward the front end and the sides of the bottom of the toasting chamber, then around the rear vertical side of said toasting chamber, and finally over the topside of said toasting chamber to the exit opening in the said body.

3. In a toaster for the toasting of bread over the open flame of a burner the combination of a box type sheet metal body in the general shape of a rectangular prism, a bottom member on said body provided with an opening for the admission of hot gases from the flame of the burner, a horizontal toasting chamber in said body with an opening on the front side of said body, said toasting chamber being closed on all sides except the open front side used for inserting and removing the bread slices, the two vertical sides of said toasting chamber adjoining the open side being formed by the vertical side walls of the said body and the back vertical wall of the said toasting chamber being located inside the said body some distance away from the back wall of said body, a horizontal deflector plate in said body between the bottom member of the body and the bottom of said toasting chamber, said deflector plate extending from the back wall of the body to within some distance from the front wall of the said body so as to direct the flow of hot gases toward the front part of the bottom of the said toasting chamber, said deflector plate also being somewhat narrower in width than the inside of said body so as to allow a portion of the combustion gases to flow directly upward to strike the side portions of the bottom of said toasting chamber, and an opening in said body above and near the front of the said toasting chamber to provide an outlet for the gases entering the toaster thru the opening in the bottom member.

4. A device for the toasting of bread over the open flame of a gasoline stove or the likes characterized by a sheet metal body in the general form of a rectangular box, a horizontal toasting chamber extending some distance into said body, said toasting chamber being closed on all sides except the open front side used for inserting and removing the bread slices, means disposed inside of said toasting chamber for supporting the bread so as to keep it a short distance above the floor surface of said toasting chamber, said means coming in contact with both the bread and the floor surface of said toasting chamber, the bottom wall of said body having an opening for the admission of hot gases into the body, a deflector plate in said body disposed between the said bottom wall of the body and the bottom of the said toasting chamber for the purpose of effectively directing the flow of hot gases thru the said body, and an opening in the said body above the said toasting chamber for the venting of gases which entered the body thru the opening in the said bottom member.

References Cited by the Examiner
UNITED STATES PATENTS

| | | | |
|---|---|---|---|
| 343,231 | 6/1886 | Dahmann | 126—275 |
| 385,348 | 7/1888 | Geisel | 126—275 |
| 464,761 | 12/1891 | Detwiler | 126—275 |

FREDERICK L. MATTESON, Jr., *Primary Examiner.*

E. G. FAVORS, *Assistant Examiner.*